(12) United States Patent
Knab et al.

(10) Patent No.: US 7,015,671 B2
(45) Date of Patent: Mar. 21, 2006

(54) CIRCUIT FOR OPERATING AN ELECTRIC MOTOR

(75) Inventors: Norbert Knab, Appenweier (DE); Thomas Asal, Horben (DE); Nikolas Haberl, Lauf (DE)

(73) Assignee: Robert Bosch GmbH, Stuttgart (DE)

( * ) Notice: Subject to any disclaimer, the term of this patent is extended or adjusted under 35 U.S.C. 154(b) by 75 days.

(21) Appl. No.: 10/451,773

(22) PCT Filed: Oct. 14, 2002

(86) PCT No.: PCT/DE02/03880

§ 371 (c)(1), (2), (4) Date: Nov. 20, 2003

(87) PCT Pub. No.: WO03/038986

PCT Pub. Date: May 8, 2003

(65) Prior Publication Data

US 2004/0075410 A1 Apr. 22, 2004

(30) Foreign Application Priority Data

Oct. 23, 2001 (DE) ................................ 101 52 170

(51) Int. Cl.
*H02P 1/46* (2006.01)
*H02P 3/18* (2006.01)
(52) U.S. Cl. ..................... 318/701; 318/778; 318/705
(58) Field of Classification Search ............... 318/138, 318/600, 601, 602, 778, 696, 254, 439, 701, 318/705, 270, 90, 798, 805, 806, 818, 823
See application file for complete search history.

(56) References Cited

U.S. PATENT DOCUMENTS

| 4,250,435 | A | * | 2/1981 | Alley et al. ................. 318/138 |
| 4,490,620 | A | * | 12/1984 | Hansen ..................... 290/38 R |
| 4,604,563 | A | * | 8/1986 | Min ........................... 318/786 |
| 4,673,859 | A | * | 6/1987 | Shero et al. ................ 318/810 |
| 4,914,371 | A | * | 4/1990 | Shibata et al. .............. 318/723 |
| 5,397,972 | A | * | 3/1995 | Maiocchi .................... 318/439 |
| 5,428,284 | A | * | 6/1995 | Kaneda et al. ............. 318/778 |
| 5,600,559 | A | * | 2/1997 | Nishimoto et al. .......... 701/41 |
| 5,694,011 | A | * | 12/1997 | Corey et al. ................ 318/444 |

(Continued)

FOREIGN PATENT DOCUMENTS

DE 197 44 729 4/1999

(Continued)

*Primary Examiner*—Marlon T. Fletcher
*Assistant Examiner*—Eduardo Colon Santana
(74) *Attorney, Agent, or Firm*—Kenyon & Kenyon

(57) ABSTRACT

A circuit configuration for operating an electric motor is described, the circuit configuration containing a timer. As a function of a first differential signal between a setpoint signal and an actual value signal, a regulator supplies a first switch signal for feeding current to the electric motor. Simultaneously, the timer is started which limits the current feed signal to a specified maximum time. A detection system detects a change in the setpoint signal and thereupon outputs a second switch signal that also starts the timer and is able to trigger the current feed to the electric motor. The circuit configuration both protects the electric motor from a thermal overload and also makes it possible to feed current to the electric motor if a setpoint changes. The circuit configuration is suitable to be used in a variable speed drive.

7 Claims, 1 Drawing Sheet

U.S. PATENT DOCUMENTS

| | | | |
|---|---|---|---|
| 5,834,911 A * | 11/1998 | Kimura | 318/254 |
| 5,910,890 A * | 6/1999 | Hansen et al. | 363/41 |
| 6,064,196 A * | 5/2000 | Oberlin et al. | 324/179 |
| 6,118,244 A * | 9/2000 | Steinbusch | 318/603 |
| 6,803,735 B1 * | 10/2004 | Liu et al. | 318/463 |

FOREIGN PATENT DOCUMENTS

| | | |
|---|---|---|
| DE | 199 08 007 | 4/2000 |
| DE | 100 07 690 | 8/2001 |
| JP | 60141184 A * | 7/1985 |
| WO | WO 21189 A1 * | 4/2000 |

* cited by examiner

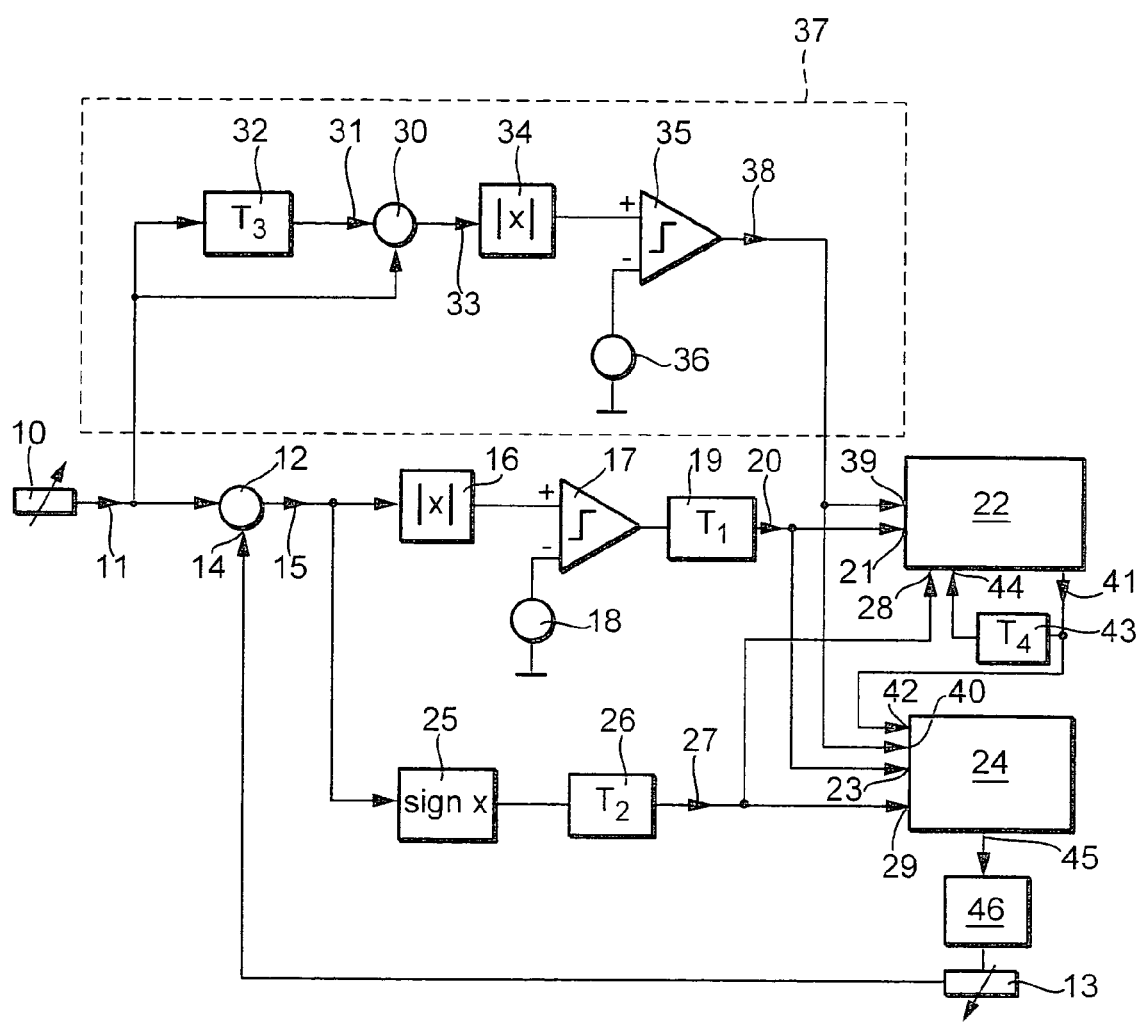

CIRCUIT FOR OPERATING AN ELECTRIC MOTOR

FIELD OF THE INVENTION

The present invention is directed to a circuit configuration for operating an electric motor.

BACKGROUND INFORMATION

A circuit configuration for starting an electric motor is described in German Published Patent Application No. 197 44 729, the circuit configuration limiting the motor current or the motor output to a specified maximum value. The described circuit configuration includes a timer, which cancels the limitation of the motor current or the output for the time specified by the timer, starting from the time the electric motor starts.

The object of the invention is to specify a circuit configuration for operating an electric motor, which protects the electric motor against thermal overload.

SUMMARY OF THE INVENTION

According to the present invention, a regulator is provided, which, as a function of a difference between a setpoint and an actual value, supplies a first switch signal as a start signal to feed current to the electric motor. In addition, the first switch signal starts a timer, which limits the current feed to the electric motor to a maximum time specified by the timer.

According to the present invention, the maximum time is available to the electric motor within which time it is possible to balance the difference between the setpoint and the actual value. If at the end of the maximum time, a difference or system deviation continues to exist, the timer stops the current feed to the electric motor and prevents a thermal overload and possible destruction of the electric motor.

If the operating voltage of the electric motor drops, it is possible that the electric motor may no longer be able to produce the necessary starting torque or may stop during operation after the occurrence of the start signal to feed current. The timer then interrupts the current feed after the end of the specified maximum time. The actual value then no longer agrees with the setpoint. This continues to be the case when the operating voltage has again assumed its nominal value.

According to the present invention, a detection system is provided, which supplies a second switch signal after a change in the setpoint, this second switch signal also starting the timer so that in the operating state described above and with another change in the setpoint, it is again possible to feed current to the electric motor. Current is fed to the electric motor based on the second switch signal each time the setpoint is changed until either the timer stops the current feed on reaching the maximum time or the position actual value has reached the position setpoint.

An advantageous embodiment of the circuit configuration according to the present invention provides that a change in the sign of the difference between the setpoint and the actual value supplies a third switch signal, which causes the feed of current to the electric motor to be cut off. This measure makes a simple implementation of the regulator possible, making it possible to stop the feed of current to the electric motor if the system deviation reaches zero.

An advantageous embodiment of the circuit configuration according to the present invention provides that the timer is designed as a retriggerable timer. The second switch signal, which the detection system supplies after a change in the position setpoint, starts the timer again independently of a time that may already have expired. The measure ensures that the maximum time for the feed of current to the electric motor is present after each setpoint change.

The electric motor is used advantageously in a variable speed drive, the setpoint corresponding to a position setpoint and the actual value corresponding to a position actual value. An example of a variable speed drive is a choke valve variable speed drive, which is situated, for example, in a motor vehicle. The regulator makes continuous positioning of the choke valve possible.

In this application, the maximum time is selected in such a way that the variable speed drive is able to run through the adjustment range in all operating states. If the sign of the system deviation is reversed, it is possible to reset the timer.

Additional advantageous refinements and embodiments of the circuit configuration according to the present invention for operating an electric motor are found in additional dependent claims and the following description.

BRIEF DESCRIPTION OF THE DRAWING

The FIGURE shows a block diagram of a circuit configuration according to the present invention for operating an electric motor.

DETAILED DESCRIPTION

According to the FIGURE, a setpoint generator 10 outputs a setpoint signal 11 to a subtractor 12, which determines the difference between setpoint signal 11 and an actual value signal 14 supplied by an actual value sensor 13 and supplies it as first differential signal 15.

After passing through a first absolute value generator 16, first differential signal 15 is compared with a first hysteresis value 18 in a first comparator 17.

After the passage of a first time delay TI 19, first comparator 17 supplies a first switch signal 20, which is fed as a start signal to a first start input 21 of a timer 22 and to a first start input 23 of a motor control 24.

Further, after passing through a zero crossing detector 25 and a second time delay T2 26, differential signal 15 reaches a first reset input 28 of timer 22 and a first cutoff input 29 of motor control 24 as a cutoff signal 27.

Setpoint signal 11 further reaches a second subtractor 30, which is further fed a delayed setpoint signal 31, which is obtained from setpoint signal 11 after passing through a third time delay T3 32.

Second subtractor 30 supplies a second differential signal 33, which is compared with a second hysteresis value 36 in a second comparator 35 after passing through a second absolute value generator 34. Components 30–36 are contained in a detection system 37, which signals a change in setpoint signal 11 by supplying a second switch signal 38.

Second switch signal 38 is fed to a second start input 39 of timer 22 and to a second start input 40 of motor control 24.

Timer 22 outputs a second cutoff signal 41 to a second cutoff input 42 of motor control 24 and to a fourth time delay 43. Fourth time delay 43 outputs delayed second cutoff signal 41 to a second reset input 44 of timer 22.

Motor control 24 outputs a current feed signal 45 to an electric motor 46, which is located, for example, in a variable speed drive (not described in greater detail), which in this application contains actual value sensor 13.

The circuit configuration according to the present invention for operating an electric motor 46 operates as follows:

Electric motor 46 is contained in a control loop that attempts to set first difference signal 15, which reflects the difference between setpoint signal 11 and actual value signal 14, to zero. Setpoint generator 10 supplies setpoint signal 11 and actual value sensor 13 outputs actual value signal 14. If the electric motor is situated in a variable speed drive (not shown in greater detail), the setpoint generator is used to specify a position setpoint, the present position actual value being supplied by actual value sensor 13.

First differential signal 15 reaches first absolute value generator 16, which frees differential signal 15 of its sign, differential signal 15 being capable of having both positive and negative signal values. First comparator 17 situated downstream of first absolute value generator 16 compares first differential signal 15 freed of its sign with first hysteresis value 18. If first differential signal 15 is outside of the hysteresis area specified by first hysteresis value 18, first comparator 17, after passing through first time delay 19, outputs first switch signal 20, corresponding to a start signal, both to first start input 21 of timer 22 and first start input 23 of motor control 24. First switch signal 20 at first start input 23 of motor control 24 results in the supply of first current feed signal 45 for electric motor 46. In operating electric motor 46, it is attempted to bring actual value signal 14 in conformity with setpoint signal 11 so that first differential signal 15 is set to zero.

In the case of a variable speed drive, electric motor 46 actuates the variable speed drive so that the position actual value detected by actual value sensor 13 is changed. As soon as actual value signal 14 conforms with specified setpoint signal 11, zero crossing detector 25 detects a zero crossing of first differential signal 15 and, after passing though second time delay 26, it outputs first cutoff signal 27 both to first reset input 28 of timer 22 and to first cutoff input 29 of motor control 24. Thereupon, motor control 24 cancels current feed signal 45 and shuts down electric motor control 46. If first hysteresis value 18 is exceeded, a new change in setpoint signal 18 results in a recurrence of first switch signal 20, which prompts motor 24 to again output current feed signal 45.

Simultaneous with the occurrence of first switch signal 20, timer 22 is started via first start input 21. Timer 22 is set to a specified maximum time $T_{max}$. Maximum time $T_{max}$ must be determined in such a way that electric motor 46 has an opportunity to bring actual value signal 14 into conformity with setpoint signal 11. If the electric motor is located in a variable speed drive, maximum time $T_{max}$ is set in such a way that electric motor 46 is able to pass through the entire adjustment range of the variable speed drive with the lowest operating voltage and maximum load torque. If the adjustment operation was carried out successfully within the maximum time, first switch signal 27 resets timer 22 via first reset input 28. If, however, maximum time $T_{max}$ has expired, timer 22 outputs second cutoff signal 41, which is fed to motor control 24 via second cutoff input 42. Thereupon, motor control 24 cancels current feed signal 45 for electric motor 46.

If necessary, second cutoff signal 41 is returned to second reset input 44 of timer 22 via fourth time delay 43. This measure causes timer 22 to be reset.

If electric motor 46 is unable to bring actual value signal 14 into conformity with setpoint signal 11 within specified maximum time $T_{max}$, motor control 24 cancels current feed signal 45 for electric motor 46. A subsequent change in the setpoint signal using setpoint generator 10 in the same direction in which it was not possible to achieve any conformity of actual value signal 14 with setpoint signal 11 results in no further occurrence of first switch signal 20 so that it is no longer possible to feed current to electric motor 46 in the event of such an additional setpoint change.

To ensure a further current feed if setpoint signal 11 is changed in the same direction that previously resulted in the cancellation of current feed signal 45 as a consequence of the expiration of maximum time $T_{max}$, detection system 37 is provided, which detects any change in setpoint signal 11 and subsequently outputs second switch signal 38.

A change in setpoint signal 11 may, for example, result through a comparison of setpoint signal 11 with delayed setpoint signal 31. To this end, setpoint signal 11 is delayed by a specified time quantum T3 in third time delay 32. Second subtractor 30 determines the difference between present setpoint signal 11 and time-delayed setpoint signal 31 and outputs second differential signal 33 to second absolute value generator 34.

Second comparator 35 compares second differential signal 33, which is freed of its sign, with second hysteresis value 36 and, if necessary, outputs second switch signal 38. Second absolute value generator 34, second comparator 35 and second hysteresis value 36 ensure that a hysteresis is produced which prevents oscillations.

Second switch signal 38 starts timer 22 via second start input 39 and via second start input 40 prompts motor control 24 to supply current feed signal 45 for electric motor 46.

A reset or a new start of timer 22 in a retrigger operation of timer 22 makes it possible to make the full length of maximum time $T_{max}$ specified by timer 22 available after each change in setpoint signal 11 using setpoint generator 10, irrespective of the operating state before the setpoint change.

First and second time delay 19, 26 make correct timing of the circuit configuration according to the present invention possible by compensation of signal delays that occur in the individual function blocks. Fourth time delay 43 for delaying second cutoff signal 41 ensures that second cutoff signal 41, if it occurs, is not immediately suppressed again due to the return to second reset input 44, so that an analyzable second cutoff signal 41 is available to second cutoff input 42 of motor control 24. The time settings for first and second time delay 19, 26 may be in the microseconds or milliseconds range. The time setting for fourth time delay 43 is preferably in the milliseconds range. If electric motor 46 is situated in a variable speed drive, maximum time $T_{max}$ specified by timer 22 will be in the seconds range, which is adequate for an adjustment operation under severe conditions. The time setting for third time delay 32 is, for example, in the seconds range. This time delay must be matched to the expected signal change of setpoint signal 11, which is, for example, in the seconds range in a manually actuated setpoint generator 10.

Zero crossing detector 25 may be implemented, for example, with the signum function. If the sign of first differential signal 15 is changed, first cutoff signal 27 occurs, it being necessary to convert the negative signal changes at the output of zero crossing detector 25 into positive signal changes, for example.

What is claimed is:

1. A circuit configuration for operating an electric motor, comprising:
   a timer;
   a regulator, wherein, as a function of a first differential signal between a setpoint signal and an actual value signal, the regulator supplies a first switch signal that triggers a current feed signal to the electric motor, wherein:
   the first switch signal starts the timer, and
   the current feed signal is limited to a maximum time specified by the timer; and
   a zero crossing detector into which is fed the first differential signal, the zero crossing detector detecting a change in a sign of the first differential signal and thereupon outputting a first cutoff signal that both resets the timer and stops the current feed signal to the electric motor.

2. The circuit configuration as recited in claim 1, further comprising:
a detection system that detects a change in the setpoint signal and thereupon outputs a second switch signal, the second switch signal starting the timer.

3. The circuit configuration as recited in claim 1, wherein: the timer includes a retriggerable timer.

4. The circuit configuration as recited in claim 1, wherein: a first hysteresis value is provided for the first differential signal.

5. The circuit configuration as recited in claim 4, wherein: a second hysteresis value is provided for a change in the setpoint signal.

6. A circuit configuration for operating an electric motor, comprising:
a timer;
a regulator, wherein, as a function of a first differential signal between a setpoint signal and an actual value signal, the regulator supplies a first switch signal that triggers a current feed signal to the electric motor, wherein:
the first switch signal starts the timer, and
the current feed signal is limited to a maximum time specified by the timer;
a detection system that detects a change in the setpoint signal and thereupon outputs a second switch signal, the second switch signal starting the timer; and
a second subtractor, wherein:
the detection system contains a third time delay to delay the setpoint signal, and
the time-delayed setpoint signal and the setpoint signal are fed to the second subtractor.

7. The circuit configuration as recited in claim 1, wherein: the electric motor is situated in a variable speed drive, the setpoint signal corresponds to a position setpoint, and the actual value signal corresponds to a position actual value.

* * * * *